United States Patent [19]
Brown

[11] 3,722,808
[45] Mar. 27, 1973

[54] CHUCK FOR ROTATABLE MEMBERS

[75] Inventor: Edward A. Brown, Kingsport, Tenn.

[73] Assignee: Eastman Kodak Company, Rochester, N.Y.

[22] Filed: Aug. 27, 1970

[21] Appl. No.: 67,323

[52] U.S. Cl. ............242/46.4, 242/46.2, 242/72.1
[51] Int. Cl. .....................B65h 75/30, B65h 79/00
[58] Field of Search..........242/46.4, 46.2, 46.3, 46.6, 242/72, 72.1

[56] References Cited

UNITED STATES PATENTS

| | | | |
|---|---|---|---|
| 2,890,001 | 6/1959 | Triquet | 242/72.1 |
| 2,733,874 | 2/1956 | Peterson et al. | 242/72 UX |
| 2,746,689 | 5/1956 | Berkepeis | 242/46.3 |
| 1,678,710 | 7/1928 | Selvig | 242/72.1 |
| 1,964,585 | 6/1934 | Larsen | 242/46.2 X |

Primary Examiner—Stanley N. Gilreath
Assistant Examiner—Milton S. Gerstein
Attorney—Cecil D. Quillen, Jr. and Malcolm G. Dunn

[57] ABSTRACT

Quick release chuck for chucking rotatable members or tubular cores wherein a flexible sleeve mounted on one end of a mandrel is caused to move axially inwardly and radially outwardly against an end of a rotatable member to hold the rotatable member in centered and seated position for rotation about its axis, and is movable axially outwardly and radially inwardly to enable the rotatable member to be withdrawn from the mandrel over the sleeve without removing any part of the chuck.

3 Claims, 7 Drawing Figures

Patented March 27, 1973

EDWARD A. BROWN
INVENTOR.

BY Malcolm F. Dunn

ATTORNEY

Patented March 27, 1973

EDWARD A. BROWN
INVENTOR.

BY

ATTORNEY

CHUCK FOR ROTATABLE MEMBERS

BACKGROUND OF THE INVENTION

The present invention is directed to a chuck for tubular cores and similar rotatable members designed to be rotated about their axes, and particularly to a chuck that rapidly centers and clamps a rotatable member about its axis of rotation and is quickly releasable from the rotatable member without the necessity of removing any part of the chuck.

The chuck has particular utility for rotatable members that are to be used in the winding and reeling arts. It will be readily apparent, however, to those skilled in the art that its applicability will extend to any situation where it is necessary to mount and demount a variety of rotatable members whether they be cylindrical, conical, spherical or the like, and so long as each of the rotatable members concerned has an opening extending along the axis of and through the rotatable member from one end to the other for ready admission through such opening of the chuck from one end to the other.

As previously mentioned, the chuck has particular utility in the winding and reeling arts since the rotatable members concerned in this art are more frequently mounted and demounted. For instance, in the textile industry yarns are wound on tubular cores, pirns, bobbins, spools, reels and the like, and it is essential that each of these rotatable members be properly centered for rotation about its axis of rotation in order that the yarn be evenly wound thereupon. Careful maintenance of predetermined tensions on the yarn is a necessity and has an effect on the ultimate characteristics of the yarn. During the winding operation, the rotatable members may undergo various wind-up speeds and at various stages of yarn build-up on the core. The centrifugal forces acting on the core package, and especially at higher rotational speeds, will result in an undesirable yarn package if the concentricity of the rotatable member is not maintained; also, the balancing of the winding assembly will become a significant problem so as to avoid undue wear of the chuck and winding mechanism.

One type of chuck that has been used in the textile industry has consisted of a mandrel rotatably supported for rotation on a spindle; a threaded rod extending axially from and at the axis of rotation of the mandrel; and a nut, usually being a plate-like member that screws onto the end of the threaded rod to center and clamp a mountable tubular core or rotatable member tightly against the mandrel, and which nut must be unscrewed and removed before the rotatable member can be demounted. The time required to screw and unscrew the nut is significant, and in the case of many such rotatable members being on a textile spinning machine on which there may be hundreds, the delay in readying the machine for operation can be quite appreciable.

Another difficulty encountered with the type of chuck described above as well as various other types that have attempted to supplant the screw type or nut type arrangement is that the tubular cores will often become jammed on the mandrel so that they must be forcibly driven off the mandrels, and thereby possibly resulting in damage to the material wound on the rotatable member.

Mechanically expandable arbors have been employed to replace the screw-on nut types, but sometimes due to operator error, the cores or rotatable members are not moved all the way into seated position, thereby resulting in an undesirable change in the winding pattern. The arbors become worn with use and become loose, so that maintenance of concentricity of the rotatable members is not always assured. U.S. Pat. No. 3,462,092 discloses a chuck for a bobbin, with the chuck having resilient rings that are caused by spring pressure to be expanded radially outwardly into frictional engagement with the interior surface of a tubular member or bobbin. U.S. Pat. No. 3,272,447 is another example of the use of expandable members for securing a tubular member on a chuck.

In those mandrels or chucks that rely on internal expansion of some member or members these are also subject to operator error in that the rotatable member may not be moved to its fully seated position.

In some chucks that rely on internal expansion of some part of the chuck, such as U.S. Pat. No. 3,430,882, or U.S. Pat. No. 3,276,718, the expansion may be due to the use of air or other fluid pressure. The use of air pressure for maintaining such internal expansion is undesirable when the rotatable member may be rotating for a great length of time. For instance, in the textile industry a bobbin may be revolving for some 12 to 14 hours before it is due to be doffed. There is the risk in the meanwhile that the air or fluid will leak and thus the rotatable member will no longer be securely gripped in an axially centered, fully seated position in the chuck.

SUMMARY OF THE INVENTION

The chuck of the present invention supports a removable and rotatable member for rotation about the axis of the member, and in turn is supported at its inner end by and is connected to a means such as a spindle or arbor. The chuck has a mandrel that defines at each end a tapered outer surface that faces the other tapered outer surface, a movable cam adjacent the tapered outer surface at the outer end of the mandrel, the outer end tapered outer surface upon being engaged by the movable cam being axially movable inwardly toward the other tapered outer surface and at the same time and by the same action being radially movable outwardly to the center and wedgingly engage between the two opposed tapered surfaces a rotatable member mounted on the mandrel, the outer end tapered outer surface after the movable cam disengages therefrom being adapted to move axially outwardly away from the other tapered outer surface and rotatable member and at the same time move radially inwardly so as to enable the removable member to be withdrawn from the mandrel and over the tapered outer surface.

It will be evident from the description of the invention that follows that the chuck will facilitate and promote rapid centering and proper seating of rotatable members, and reliable clamping of such members for rotation at various speeds.

The component parts of the chuck are readily replaceable without having to return the mandrel to the factory for repair and servicing thereof.

Significant time savings will be involved since a rotatable member such as a bobbin, or spool, or the like and as previously mentioned, may be quickly mounted and demounted thereby facilitating increased production.

Also, there is no necessity for using any tools to mount and demount the rotatable and removable members; and furthermore, there will be no jamming of the removable members on the mandrels thus requiring them to be forcibly removed and thereby resulting in possible damage to the material wound on the removable member.

The chucks not only have utility in the textile industry but are also useful in other industries and arts where it is necessary to mount and demount rotatable members.

DESCRIPTION OF THE PREFERRED EMBODIMENT

Figure 1:
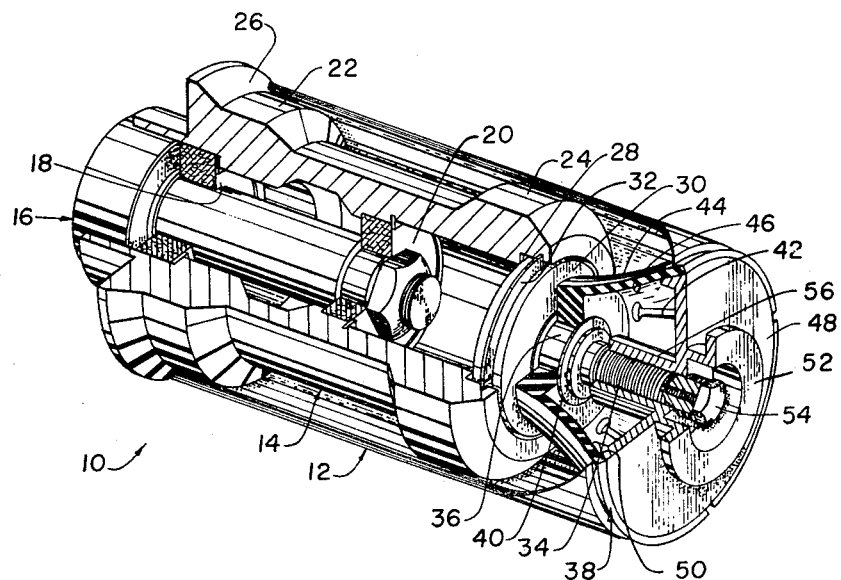
FIG. 1 is a perspective view of the chuck with a rotatable member mounted thereon and the flexible sleeve being urged by the movable cam into the engaged condition against an end of the rotatable member.
Figure 2:
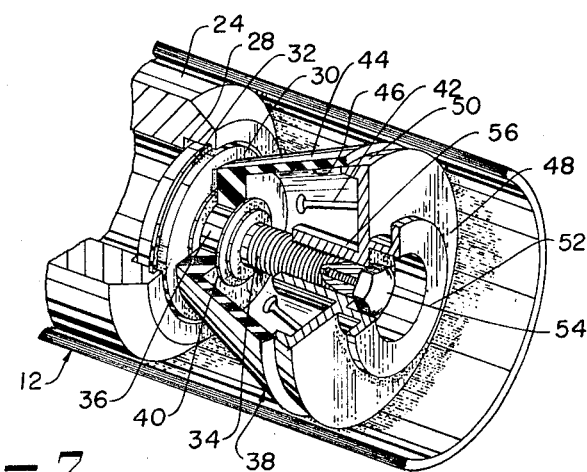
FIG. 2 is a fractional view of that shown in FIG. 1 and illustrating the flexible sleeve in the disengaged condition from the end of the rotatable member and the rotatable member being in the process of being withdrawn over the flexible sleeve.

In reference to FIGS. 1 and 2, the chuck is shown at 10, the rotatable and removable member at 12 which may be a bobbin, spool, pirn or any other type or any other configuration, and the mandrel is shown at 14.

The mandrel 14 is supported at its inner end by a spindle or arbor 16, and may rotate relative to the spindle by means of bearing members 18 and 20. The mandrel is provided with annular surfaces 22, 24 which serve to support the rotatable and removable member 12 when the latter is in seated position on the mandrel. The annular surfaces each have a diameter that is slightly less than the inside diameter of the rotatable member so as to enable the rotatable member to slide thereover into seated position and to be withdrawn from the mandrel in similar manner.

The mandrel at its inner end and adjacent annular surface 22 is provided with an annular shoulder that defines a tapered outer surface 26 against which an inner end of the rotatable member or tubular core 12 may be wedgingly seated.

The outer end of the mandrel is provided with a counterbore recess 28 within which is seated an arbor 30 that is held in the counterbore recess by retainer ring 32. Arbor 30 in turn is provided with a threaded rod 34, which is coextensive with the axis of the mandrel and extends axially outwardly from the end of the mandrel. The inner end of the threaded rod adjacent the base of the arbor is provided with an annular shoulder 36 around which is seated a flexible sleeve 38. The sleeve is held in position on the annular shoulder by retainer ring 40.

The flexible sleeve 38 is cone-shaped or frustoconical in configuration and may be of a semi-rigid material, such as nylon 6/6, and the like or may be made from a more elastic material, such as rubber or neoprene, and the like. If the sleeve is made from a semi-rigid material, it is preferable to provide spaced slots 42 for added flexibility. The flexible sleeve defines on its outer periphery a tapered outer surface 44, and on its inner periphery a tapered inner surface 46.

A movable cam in the form of a flanged nut 48 is in threaded engagement with the threaded rod 34, and is provided at its outer periphery with a frusto-conical or conical shaped flange defining a tapered outer surface 50. The latter surface is tapered at the same angle as the tapered inner surface 46 of the flexible sleeve 38, or in other words is designed to conform to the sleeve, and the sleeve is designed to conform to the inner edge of the rotatable member.

When the knob 52 at the outer end of flanged nut 48 is manually rotated, the tapered outer surface of the nut is moved axially inwardly into camming engagement with the tapered inner surface 46 of the flexible sleeve, thereby urging and causing the engaged portion of the sleeve to be moved axially inwardly, and at the same time and by the same action the sleeve is caused to be flexed radially outwardly into an engaged condition with the outer end of the tubular core or rotatable member 12. This operation serves also to urge the rotatable member into a fully seated position against the tapered outer surface 26 of the annular shoulder at the inner end of the mandrel, and further serves to center the rotatable member about its axis of rotation. In this manner the two tapered outer surfaces, 26 and 44, are in opposed facing relation to each other and thereby serve to releasably and wedgingly engage in clamping relation therebetween the rotatable member. The tapered outer surface 50 on the movable cam or flanged nut bears against the flexible sleeve and holds the sleeve firmly against and in frictional engagement with the inner edge of the rotatable member 12.

When the knob is manually rotated in the opposite direction, the flanged nut is moved axially outwardly from camming engagement with the flexible sleeve, thereby enabling the sleeve to move axially outwardly and to contract radially inwardly out of engagement with the rotatable member. As may be seen from the drawings, the greatest diameter of the flexible sleeve in its disengaged, non-flexed condition is less than the inner diameter of the rotatable member so as to enable the rotatable member to be withdrawn in sliding relation over the mandrel and the outer edge of the flexible sleeve, and another rotatable member to slide onto the mandrel.

A stop member 54 is provided at the end of the threaded rod 34 and serves to abut the outer end of hollow shaft 56 on the flanged nut and thereby limit the outer axial movement of the flanged nut.

It should be evident from the description given thus far, that the different component parts of the mechanism of the chuck would be readily replaceable without difficulty, and that the flexible sleeve provides still another advantage not heretofore mentioned: Since the flexible sleeve in the engaged position against the edge of the rotatable member is interposed between the rotatable member and the tapered outer surface 50 on the flanged nut, the tapered outer surface 50 will not become jammed into the end of the rotatable member because it will readily move axially away and out of camming engagement with the tapered inner surface 46 of the flexible sleeve.

It will also be observed that only a few turns of the flanged nut by the operator in either direction will serve to lock a rotatable member on the mandrel 14 or release same. The axial inward movement of the movable cam or flanged nut causes the rotatable member to be moved into its fully seated position and to be centered about its axis of rotation, thus operator error is minimized as to the seating aspect of the operation.

Figure 3:
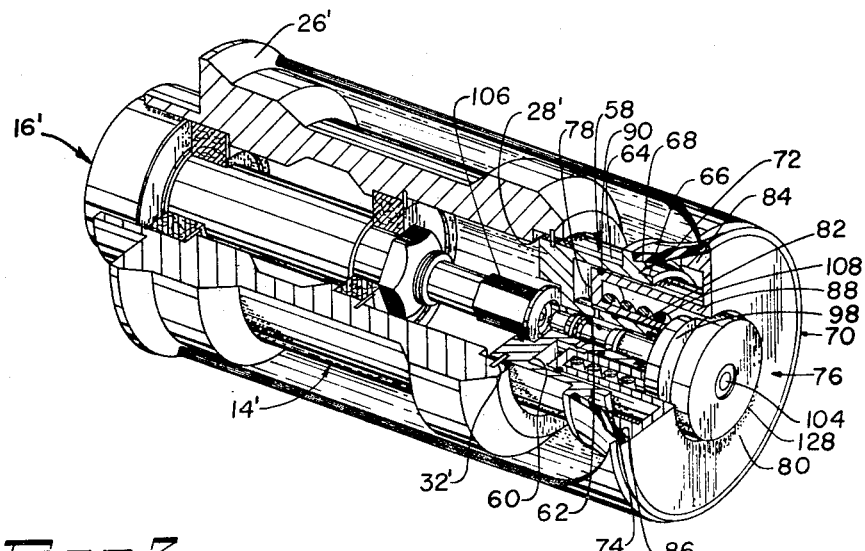
FIG. 3 is a perspective view of a fluid operated chuck, and illustrating the flexible sleeve being urged by the movable cam into the engaged condition against an end of the rotatable member.
Figure 4:
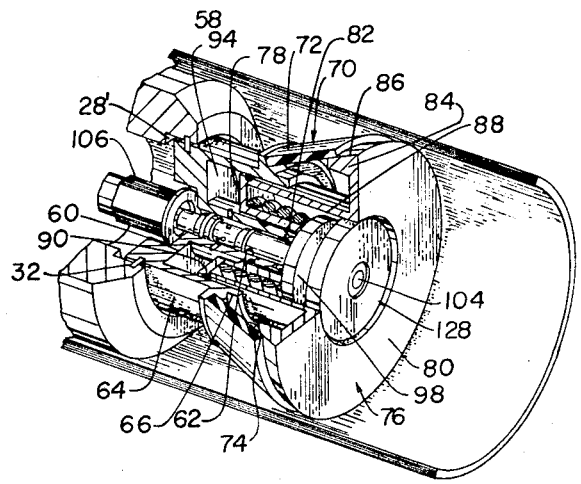
FIG. 4 is a fractional view of that shown in FIG. 3, and illustrating the flexible sleeve in disengaged condition from the end of the rotatable member and the rotatable member being in the process of being withdrawn over the flexible sleeve.
Figure 5:
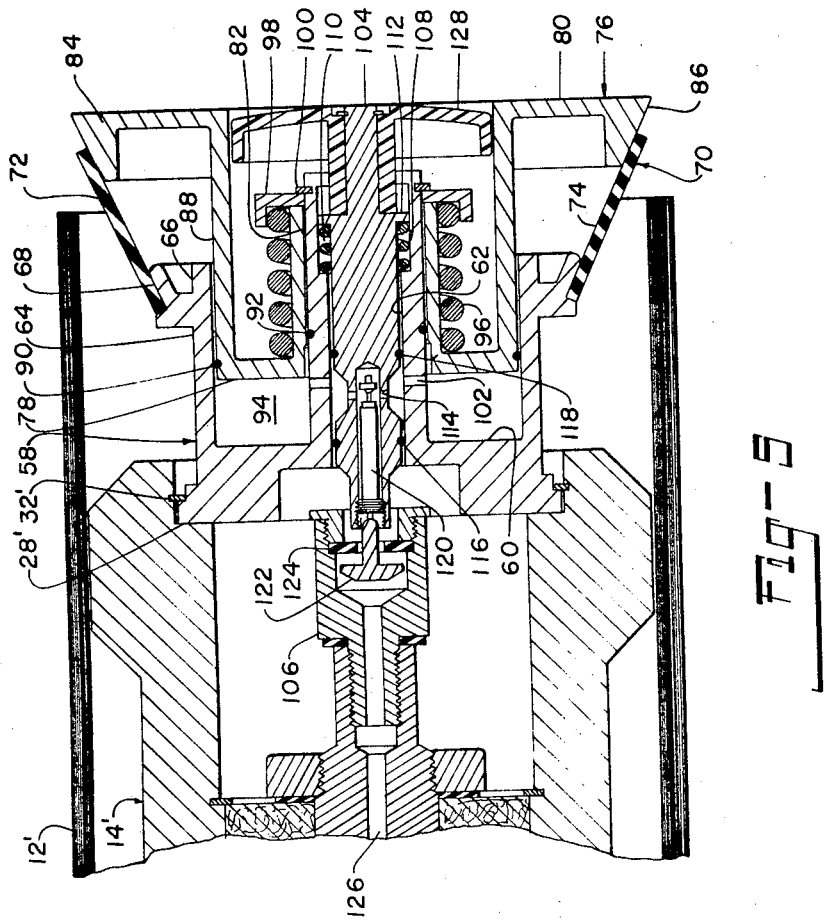
FIG. 5 is an enlarged fractional cross-sectional view of that illustrated in FIGS. 3 and 4.

In FIGS. 3, 4 and 5 a fluid operated or pneumatic embodiment is disclosed which is still more rapid in action than that disclosed in FIGS. 1 and 2. The reference numbers are primed where they serve to identify the same parts having the same functions as previously described with reference to FIGS. 1 and 2.

The mandrel 14' is provided at its outer end with a cylindrical member 58, which is connected to the mandrel by being seated within the counterbore recess 28' and retained in the counterbore recess by retainer ring 32'. The cylindrical member is provided with an end wall 60 that is adapted to extend axially inwardly toward the mandrel; a hollow shaft 62 that extends axially outwardly from the end wall; and a cylindrical wall 64 that is adapted to extend axially outwardly from the end wall in concentric relation to the hollow shaft 62. The cylindrical wall 64 has at its outermost periphery an annular shoulder 66 and an annular beveled wall 68 adjacent the annular shoulder and defining a tapered outer surface. A flexible, frusto-conical sleeve 70 may be readily slipped into position on the tapered outer surface of the beveled wall 68 in abutting relation against the annular shoulder 66 and in effect forms a projected extension of the beveled wall 68.

The flexible sleeve 70 defines on its outer periphery a tapered outer surface 72, and on its inner periphery a tapered inner surface 74. It will be observed that the tapered outer surface 72 of the sleeve is in opposed relation to the tapered outer surface 26' of the inner end of the mandrel, and thus the two tapered outer surfaces 26' and 72 together serve a similar function as that of the opposed tapered outer surfaces 26 and 44 described with respect to the embodiment of FIGS. 1 and 2.

A movable cam in the form of a piston member 76 is disposed in sliding relation within the cylindrical member 58 toward and away from the end wall 60 and along the outer surface of the hollow shaft 62. The piston member defines an inner end wall 78 adapted to extend axially inwardly in facing relation toward the end wall 60 of the cylindrical member; an outer end wall 80 adapted to extend axially outwardly; and a hollow shaft 82 that extends axially outwardly from the piston member inner wall 78. The hollow shaft 82 is adapted to be disposed in sliding relation to and over the cylindrical member hollow shaft 62. The outer end wall 80 of the piston member has at its outer periphery an axially inwardly extending flange 84 that defines a tapered outer surface 86. The latter tapered outer surface is adapted to abut against the tapered inner surface 74 of the flexible sleeve when moved into camming engagement thereagainst. The piston member further defines a cylindrical wall 88 that extends between the inner end wall 78 and the outer end wall 80 and which is also adapted to be disposed of in sliding relation to the cylindrical member cylindrical wall 64.

A fluid type seal is provided between the cylindrical wall 64 of the cylindrical member 58 and the cylindrical wall 88 of the piston member 76 by means of a rubber O-ring 90 disposed in an annular recess within the outside surface of the cylindrical wall 88, and between the hollow shaft 82 of the piston member 76 and the hollow shaft 62 of the cylindrical member 58 by means of the rubber O-ring 92 disposed in an annular recess within the outside surface of the hollow shaft 62 of the cylindrical member 58. In this manner a fluid, preferably air, may be admitted into the chamber 94, as defined between the piston member inner end wall 78 and the cylindrical member end wall 60, to force the piston member axially outwardly against the biasing effect of compression spring 96 that encircles the hollow shaft 82 of the piston member.

The piston member is normally urged or biased axially inwardly by the compression spring 96 so that the flexible sleeve 70 will be cammed into the engaged position. One end of the compression spring abuts against the piston member inner end wall 78 while the opposite end of the spring abuts against a flanged washer 98, which is retained at and on the outer end of the cylindrical member hollow shaft 62 by retainer ring 100.

The fluid or air is admitted into and exits from the chamber 94 through the fluid ports 102, which are provided in the hollow shaft 62 of the cylindrical member 58, by means of the valve stem 104 and air chuck 106. The valve stem is slidably disposed within the hollow shaft 62 of the cylindrical member 58 and is normally urged axially outwardly by compression spring 108 that encircles one end of the valve stem and seats within the counterbore recess 110 provided within the outer end of the hollow shaft 62 of the cylindrical member 58. One end of the compression spring abuts against the seat of the counterbore recess 110 while the opposite end of the spring abuts against the flange 112 provided adjacent the outer end of the valve stem.

The valve stem is provided with fluid ports 114 through which air may flow into and exit from the fluid ports of the cylindrical member hollow shaft 62. A fluid type seal is provided on either side of the fluid ports 114 and between the valve stem and the inside surface of the hollow shaft 62 by means of rubber O-rings 116 and 118 disposed in annular recesses within the outside surface of the valve stem.

The inner axial end of the valve stem is provided with a spring biased check valve 120 which operates in conventional manner similar to the check valve or valve core used in automobile tires to admit air into and to let air out of tires.

The air chuck 106 is provided with a check valve 122 that is normally biased by fluid pressure axially outwardly in fluid tight relation with an apertured sealing member 124 seated in an annular recess provided within the inside surface of the air chuck. The air chuck is threadedly connected to and within the outer end of the spindle or arbor 16', and a fluid passage 126 extends through the spindle for providing air to the air chuck from a source of supply.

OPERATION

When the knob 128, which is seated upon the outer end of the valve stem 104 in abutment with the opposite side of the valve stem flange 112, is depressed by the operator, the valve stem is moved against the biasing effect of the compression spring 108 axially inwardly until the valve stem check valve is brought into engagement with the air chuck check valve 122. The valve stem check valve is depressed by the air chuck check valve, the latter being similarly depressed and thereby enabling air to flow through therepast into the valve stem and through the fluid ports 114 and 102 into the chamber 94. The entering fluid or air forces the piston member 76 axially outwardly against the biasing effect of compression spring 96. The axial outer movement of the piston member moves the tapered outer surface 86 of the flange on the piston member out of camming engagement with the flexible sleeve 70, thereby enabling the engaged portion of the sleeve to move axially outwardly and at the same time enabling the sleeve to contract radially inwardly. The rotatable member 12' then may be withdrawn from the mandrel over the outer edge of the flexible sleeve and another rotatable member loaded on the mandrel.

When the new rotatable member is on the mandrel, the operator again depresses knob 128, but with a lighter pressure which moves the valve stem again axially inwardly until the valve stem check valve is brought into engagement with the air chuck check valve. The spring bias of the valve stem check valve is less than the pressure of the biasing air against the air chuck check valve. Thus only the valve stem check valve will be depressed and thereby releasing the air in the chamber 94. Upon release of the air from the chamber, the compression spring 96 again urges the piston member axially inwardly, thereby camming against and moving the flexible sleeve into the engaged position with the rotatable member 12'. The rotatable member is moved into its proper seated and centered position and is wedgingly and clampingly engaged between the opposed tapered outer surfaces 26' and 72.

It will thus be observed that the fluid or air pressure is only used to release a rotatable member, while a compression spring is used to retain the rotatable member in clamped condition on the chuck. Operator error is greatly minimized because the compression spring acting on the piston member serves to assure that the rotatable member is moved into proper seated position on the chuck. All of the advantages described above with respect to FIGS. 1 and 2 also inhere with respect to the embodiment of FIGS. 3, 4 and 5.

FLEXIBLE SLEEVE CONSTRUCTIONS

Figure 6:
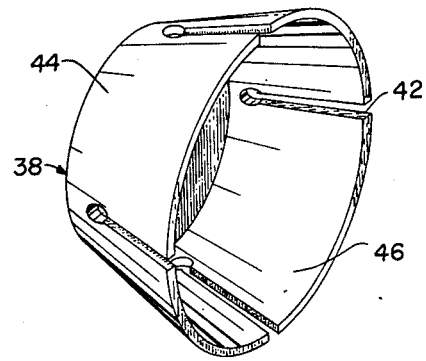
FIG. 6 is an isometric view of one form of flexible sleeve that may be used and as illustrated in part in FIGS. 1 and 2.
Figure 7:
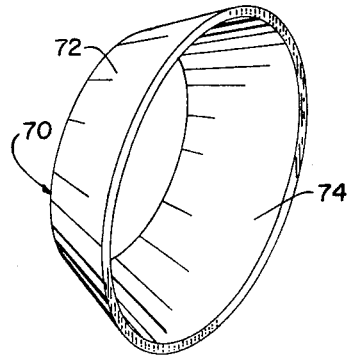
FIG. 7 is an isometric view of another form of flexible sleeve that may be used and as illustrated in FIGS. 3, 4 and 5.

FIGS. 6 and 7 disclose in fuller detail the embodiments of the flexible sleeve illustrated respectively in FIGS. 1-5. In FIG. 6 the material may be a semi-rigid material, as previously mentioned, such as nylon 6/6. The flexibility of the material is enhanced by slotting the sleeve as shown at 42. In FIG. 7 the material may be more flexible, such as rubber, neoprene and the like, also as previously mentioned.

The material of the sleeves may differ depending too upon the weight and size of the rotatable member. Since the chuck will usually be in horizontal position when in operation, the primary force upon the rotatable member will be centrifugal, thus there should be very little axial forces involved during operation, assuming that the rotatable member will be in balance across its length.

The sleeve, upon becoming worn, or upon and in the event of any loss of flexibility, may be readily replaced without difficulty and without removal of the chuck from the spindle.

It will be appreciated and readily recognized of course that the slotting of the sleeve to enhance flexibility in effect results in a series of finger-like portions that are cammed into the engaged condition with a rotatable member or tubular core. Thus there may be greater or less spacing between the finger-like portions, depending upon weight and size of the rotatable member, the nature of the material of which the finger-like portions are made, and the like.

Since in starting and stopping of the rotation of the rotatable members, there will be inertial forces present tending to cause the rotatable member to shift in a rotation direction one way or the other relative to the flexible sleeve, it will be preferable that the surface of the sleeve that is to be engaged with the tubular core be roughened to enhance frictional engagement. A semi-rigid plastic sleeve will probably need this treatment more than a rubber or neoprene sleeve.

The invention has been described in detail with particular reference to preferred embodiments thereof, but it will be understood that variations and modifications can be effected within the spirit and scope of the invention.

I claim:

1. A rotatable chuck for supporting a removable member for rotation about the axis of the member, the chuck at its inner end adapted to be supported by and connected to a rotatable drive means, said chuck comprising:
    a mandrel over the outer end of which the removable member may be moved into seated position on the mandrel and withdrawn from the mandrel and defining surfaces for supporting said removable member when in said seated position;
    said mandrel at its inner end having an annular shoulder defining a tapered outer surface and at its outer end a cone-shaped flexible sleeve defining a tapered outer surface, the two tapered outer surfaces being in opposed relation to each other and being adapted to wedgingly engage therebetween and to center on the axis of rotation the removable member;
    said flexible sleeve being adapted to be axially flexed inwardly toward the other tapered outer surface and at the same time flexed radially outwardly into wedging engagement with said removable member, and to be in a nonflexed contracted condition axially outwardly of and radially inwardly of and out of engagement with the removable member so as to enable said removable member to be moved into said seated position and to be withdrawn from the mandrel in sliding relation over the mandrel;

movable means adapted to be moved into engagement with said flexible sleeve and to cause said flexible sleeve to flex axially inwardly and flex radially outwardly into said wedging engagement with the removable member, thereby urging the removable member into centered position on said axis of rotation and moving the removable member into said seated position, and to be moved out of engagement and thereby enable said flexible sleeve to return to said axially outwardly and non-flexed contracted condition; and spring means adapted to normally urge said movable means axially inwardly of the mandrel, and further including pneumatic means adapted upon actuation to urge said movable means axially outwardly of the mandrel, and wherein said movable means is spring-biased into engagement with said flexible sleeve and is pneumatically operated to move out of engagement with said flexible sleeve and against the spring-biased action.

2. A rotatable chuck for supporting a removable member for rotation about the axis of the member, the chuck at its inner end adapted to be supported by and connected to a rotatable means, said chuck comprising:

a mandrel over the outer end of which the removable member may be moved into seated position on the mandrel and withdrawn from the mandrel and defining surfaces for supporting said removable member when in seated position on the mandrel and having at its inner end an annular shoulder defining a tapered outer surface;

fluid cylinder means connected to the outer end of the mandrel and including a piston axially movable inwardly and outwardly of the mandrel outer end, spring means normally urging said piston inwardly of the mandrel outer end and means for introducing fluid into the cylinder means to cause the piston to be forced outwardly of the mandrel outer end against the effect of the spring means;

a frusto-conical flexible sleeve connected to said fluid cylinder means and defining a tapered outer surface that is in opposed relation to the tapered outer surface on the mandrel, the two tapered outer surfaces being adapted to wedgingly engage therebetween and to center on the axis of rotation the rotatable member;

said piston further having means for engaging said flexible sleeve and thereby causing said sleeve to be axially flexed inwardly toward the other tapered outer surface and flexed radially outwardly into wedging engagement with said removable member when said spring means urges said piston inwardly of the mandrel outer end; and operating means operable for enabling said fluid to be introduced into said fluid cylinder means and for releasing said fluid from said fluid cylinder means, said flexible sleeve upon fluid being introduced into said cylinder means being enabled to flex axially outwardly and to a non-flexed condition radially inwardly of and out of engagement with the removable member so as to enable said removable member to be moved into said seated position and to be withdrawn from the mandrel in sliding relation over the mandrel.

3. A chuck for receiving thereon a rotatable member and being connected at its inner end to a spindle, said chuck comprising:

a mandrel;

said mandrel having at its inner end a tapered outer surface adapted to be wedgingly engaged thereagainst by one end of the rotatable member, and having at its outer end flexible means adapted in one condition to be flexed axially inwardly and radially outwardly into wedging engagement against the other end of the rotatable member to move said rotatable member against the inner end tapered outer surface, and adapted in a second condition to flex radially inwardly of and axially outward of engagement with the rotatable member and thereby enable the rotatable member to be withdrawn from the mandrel over the flexible means;

means movable against said flexible means and thereby causing said flexible means to be moved into said one condition and movable away from said flexible means to enable said flexible means to move into said second condition; and spring means adapted to normally urge said movable means axially inwardly of the mandrel, and further including pneumatic means adapted upon actuation to urge said movable means axially outwardly of the mandrel, and wherein said movable means is spring-biased into engagement with said flexible means and is pneumatically operated to move out of engagement with said flexible means and against the spring-biased action.

* * * * *